Nov. 10, 1925.
A. A. KRAMER ET AL
1,560,699
WELDING MACHINE
Filed Nov. 9, 1923
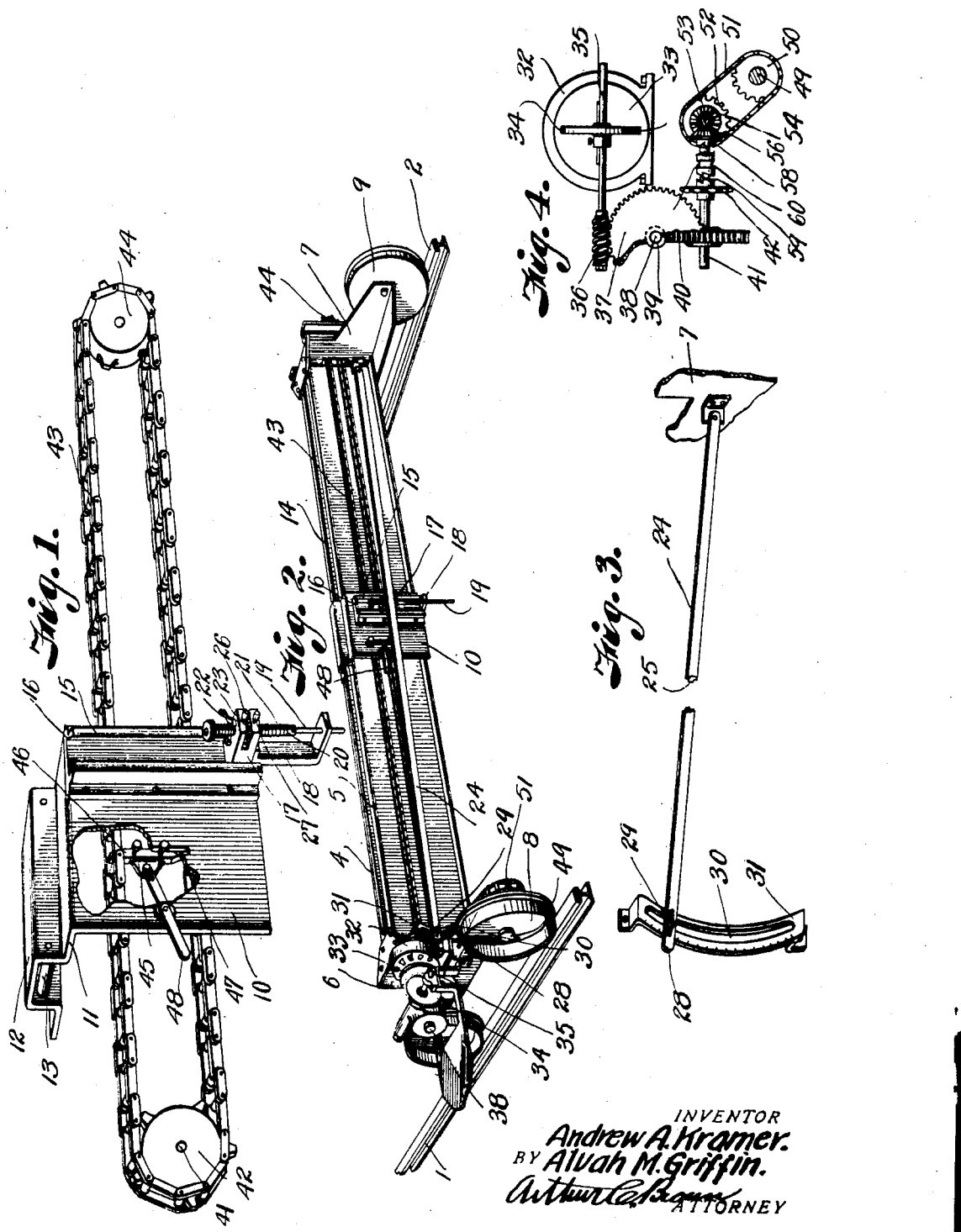
INVENTOR
Andrew A. Kramer.
BY Alvah M. Griffin.
Arthur C. Brown
ATTORNEY Patented Nov. 10, 1925.

1,560,699

UNITED STATES PATENT OFFICE.

ANDREW A. KRAMER AND ALVAH M. GRIFFIN, OF KANSAS CITY, MISSOURI.

WELDING MACHINE.

Application filed November 9, 1923. Serial No. 673,746.

*To all whom it may concern:*

Be it known that we, ANDREW A. KRAMER and ALVAH M. GRIFFIN, are citizens of the United States, residing at Kansas City, in the county of Jackson and State of Missouri, have invented certain new and useful Improvements in Welding Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to electric welding machines, that is to a machine in which an electric arc furnishes the heat for completing the welding operation. In such machines it is desirable to provide a carbon electrode for heating the welding wire and the material to be welded and it is desirable to pass the electrode along the seam and to preferably feed the electrode so as to maintain its end a uniform distance away from the work, it being understood that the consumption of the carbon electrode will vary in proportion to the amount of current passed through it.

We have provided a novel form of welding machine which is shown generically as consisting of a carriage, a travelling electrode supporting means, means for feeding the electrode and means for causing the electrode support to traverse the carriage in either of two directions. The electrode feeding means constitutes the subject matter of another application but it will be briefly described hereinafter, this application being confined more particularly to the general assembly of the welding machine.

The novel construction of our invention will be understood by reference to the following description in connection with the accompanying drawings, in which:

Fig. 1 is a perspective view of the electrode supporting means and the drive means therefor.

Fig. 2 is a perspective view of the welding machine.

Fig. 3 is a detailed view of the electrode feed and

Fig. 4 is a view of the drive mechanism.

Referring now to the drawings by numerals of reference:

1 and 2 designate rails on which the carriage 3 may travel. The carriage is shown as consisting of two channels 4 and 5 secured together by the end plates 6 and 7 to which are secured the wheels 8 for one end of the machine and 9 for the other, it being obvious of course that the wheels roll on the rails 1 and 2. Supported on the channels 4 and 5 is an electrode support constituting the carriage which may traverse the channels 4 and 5 from end to end. The support is shown as comprising a vertical plate 10 having a right angular extension 11 intermediate the ends of which is a channel offset portion 12 supporting rollers 13, which may rest upon the rail 14 fastened between the channels 4 and 5, the rollers being obviously located in the channel 12 to minimize friction. The plate 10 carries a vertical grooved guide 15 having a dove-tailed groove 16 therein to receive a head 17 which is adapted to slide in the dove-tailed groove and which carries a step or bracket 18 in which is guided a carbon electrode 19 carried by the holder 20 in the block or head 17 and the holder having a plurality of circular grooves 21, any one of which may be engaged by a latch 22 so that there can be no vertical movement of the holder but the holder may be turned by a gear 23 which is keyed to the holder and which receives rotation from teeth on a feed bar 24. The teeth 25 on the feed bar 24 engage the teeth on the gear so that the gear will be rotated after the supporting member, consisting of the plate 10 and its appurtenances move along the carriage. The block 17 carries two outstanding pins 26 and 27 which straddle the feed bar 24 so that the block 17 is really supported by the feed bar 24 and the pins 26 and 27, therefore the angular inclination of the feed bar 24 will determine the feed of the electrode 19. The feed bar is pivoted to the end plate 17 and it has an end 28 provided with a set screw 29 movable in the arcuate slot 30 on the bar 31, therefore the end 28 can be swung to the proper position to provide the necessary angle for the feed of the electrode, it being obvious that the greater the angle the greater the feed and since the electrode will burn away faster when heavy current is passed through it, then when lighter current is passed through it, it will be apparent that for heavy plates the bar will be set at a greater angle than when lighter plates are being welded. Appropriate means is provided for moving the secondary carriage or electrode support across the main carriage of the machine and since the electrode should move along the seam at a relatively slow speed we have provided a reduction gearing between the motor and the pinion which drives the chain imparting motion to the secondary carriage. By reference to Fig. 4 it will be observed that the motor 32 is provided with a friction disc 33 driving the friction disc 34 on worm shaft 35. The worm 36 on worm shaft 35 meshes with the worm gear 37, on shaft 38 of which is a worm 39 which in turn meshes with a worm gear 40 mounted on a shaft 41 and on shaft 41 is a sprocket 42 for driving the chain 43, also movable about the idler 44 at the opposite end of the machine. The secondary carriage is not directly connected to the sprocket chain 43 but it may be connected by a double toothed dog 45 having toes 46 and 47 to be alternately engaged with the upper and lower course of the sprocket 43, the dog being actuated by a lever 48 on plate 10. When the toe 46 engages the upper course of the chain the carriage will be moved in one direction and when the toe 47 engages the lower course of the chain the secondary carriage will be moved in the opposite direction. By reference to Fig. 1, it will be observed that if the chain is constantly operated at a relatively low speed the secondary carriage can be operated in either direction in an expeditious and convenient manner. The main carriage will be moved on the rails 1 and 2 until the electrode is lined up with the proper seam, then the machine will be set in operation.

The work can be laid out in the shop so that the main carriage can be fed along to weld the seams at proper intervals, therefore by utilizing a welding machine constructed in accordance with our invention the welding operations will be greatly expedited.

In order to feed the carriage along the track certain propelling means is provided. On the shaft 49 carrying the wheel 8 is a sprocket 50 around which a sprocket chain 51 passes, the sprocket chain 51 engaging a sprocket 52 on a shaft 53 carried in appropriate bearings on the frame. The sprocket 53 is carried by a shaft 54 having a gear 56 which meshes with the bevel gear 57 loose on the shaft 41 as is also the sprocket 42. The gear 56 has a clutch member 58 and the sprocket 42 has a clutch member 59. The clutch members 58 and 59 are adapted to be engaged to the ends of a longitudinal moving clutch 60, keyed on the shaft 41 so that when the clutch member 60 engages the clutch member 59 the chain 43 will be actuated but the carriage will not be moved. When the clutch member 60 engages the clutch member 58 the propelling mechanism will be operated but the chain 43 will not be operated. Therefore it will be seen that the drive mechanism may propel the vehicle to bring the carbon 19 in line with the work, then the propelling mechanism will be rendered ineffective and the welding mechanism will become effective and vice versa. Consequently the propelling of the carriage and the driving of the welding mechanism may be accomplished from the same motor.

What we claim and desire to secure by Letters-Patent is:

1. A welding machine comprising a main carriage, a second carriage movable across the first carriage, a drive mechanism and means for rendering the drive mechanism effective for either the first or second carriage.

2. A welding machine comprising a main carriage movable in a straight line, a second carriage movable across the path of the first carriage, a drive mechanism, means for rendering the drive mechanism effective for either the first or second carriage and an automatically adjustable carbon carrier supported by the second carriage.

3. A welding machine comprising a main carriage movable in a straight line, a second carriage movable across the first carriage, a drive mechanism means for rendering the drive mechanism effective for either the first or second carriage, and an automatically adjustable carbon carrier supported by the second carriage, the carbon carrier having movement on the second carriage to effect its automatic adjustment.

In testimony whereof we affix our signatures.

ANDREW A. KRAMER.
ALVAH M. GRIFFIN.